United States Patent [19]

Schulze-Beckinghausen et al.

[11] Patent Number: 4,776,243
[45] Date of Patent: Oct. 11, 1988

[54] HYDRAULIC SAFETY INTERLOCK SYSTEM

[75] Inventors: Jorg Schulze-Beckinghausen, Garbsen; Hans-Christian Bock, Burgdorf, both of Fed. Rep. of Germany

[73] Assignee: Weatherford/Lamb, Inc., Houston, Tex.

[21] Appl. No.: 801,718

[22] Filed: Nov. 26, 1985

Related U.S. Application Data

[63] Continuation of Ser. No. 566,634, Dec. 29, 1983, abandoned.

[30] Foreign Application Priority Data

Dec. 29, 1982 [DE] Fed. Rep. of Germany ....... 3300034
Dec. 29, 1982 [DE] Fed. Rep. of Germany .... 300032[U]

[51] Int. Cl.4 ............................................. B25B 13/00
[52] U.S. Cl. .................................. 81/57.44; 81/57.19; 137/491; 251/26
[58] Field of Search ................. 81/57.44, 57.19, 57.11, 81/57.16, 57.15; 137/489, 491; 251/26

[56] References Cited

U.S. PATENT DOCUMENTS

| 2,780,950 | 2/1957 | Province | 81/57.44 |
| 3,174,410 | 9/1968 | Booth | 137/491 |
| 3,677,287 | 7/1972 | Morris | 137/491 |
| 3,921,473 | 11/1975 | Boyadjieff | 81/57.19 |
| 4,170,907 | 10/1979 | Cathcart | 81/57.11 |

Primary Examiner—Frederick R. Schmidt
Assistant Examiner—Bradley I. Vaught
Attorney, Agent, or Firm—Vaden, Eickenroht, Thompson & Boulware

[57] ABSTRACT

A power tong assembly wherein a safety latch mechanism includes a power part equipped with two outlet side connections, one of which is connected to a control part for controlling the opening cross section of the tank side connection. The power part has a control element in the form of a piston-shaped valve body with equal sized surfaces on both end faces subject to the pressure of the working medium and with a bore running in the direction of the valve body movement. This bore has a conical extension of its inlet flow end. This blocks the direct connection of the supply with the return to the tank.

7 Claims, 3 Drawing Sheets

HYDRAULIC SAFETY INTERLOCK SYSTEM

This is a continuation of application Ser. No. 566,634 filed Dec. 29, 1983, now abandoned.

The invention concerns switching and control equipment for operational devices which can be actuated by flowing working media—for example, hydraulically or pneumatically—in particular for the operation of screw tongs for screwing drilling industry sucker rods, casings and drill pipes.

In the drilling industry, powered screwing tongs are employed for the screwing of sucker rods, casings and drill pipes. Screw tongs are necessary for assembling or dismantling drill strings and pipe sets.

Screw tongs, which are generally used and have an open rotor system, are described in German Patent No. 27 26 472. They have a housing opening which serves to accept the string. Tongs with an open rotor system have captured a very large proportion of the market because they can be very rapidly pivoted in for screwing purposes and subsequently pivoted away from the working area.

Screw tongs develop very high torques when producing pipe connections. When the force is being delivered, forces occur at the tongs opening which tend to bend them open. In order to relieve the housing cheeks of load, a locking flap is installed. In the main, this flap reinforces the body of the tongs and prevents bending open, which later leads to damage or failure of the device.

The reinforcement of the tongs serves not only as a flap but, simultaneously, as protection equipment for the operating personnel by blocking access to and interference with the rotor and gripping system during operation.

The flap equipment has been outstandingly successful as a reinforcement and safety measure. However, it often happens that operating personnel, for supposed time-saving reasons, leave the flap open during the screwing procedure or even dismantle it. This negligence leads to damage to the device and, in addition, necessarily involves a dangerous situation for the personnel concerned.

A flap actuation is described in U.S. Pat. No. 2,705,614, which flap actuation hydraulically closes the flap as soon as the gripping system of the tongs is activated because the cylinders are interconnected. This type of flap safety system cannot be transferred to other screwing device types. The drive by means of a hydraulic force represents a danger for the personnel at the moment of actuation.

U.S. Pat. No. 4,170,907 shows one safety possibility. A pneumatic valve examines the position of the flap and, if the flap is pivoted in, switches the compressed air supplied to the control portion of a large-volume directional control valve which then makes possible the hydraulic flow through the driving motor.

When the flap is open, the valve control portion is ventilated and a spring pushes the valve spindle into the outlet position and blocks the supply of hydraulic oil to the motor. A disadvantage is that this type of safety arrangement requires the supply of outside energy, in this case, compressed air.

Safety regulations demand that a powered screwing device can be switched at any time without the use of power by a person not taking part in the operation. The device must also be incapable of actuation without a renewed operational release.

In applying this regulation, two types of control are known:

The supply for the operational device is led to the screwing device through a large-volume directional control valve, which is located on the working platform. In order to interrupt the flow of power, the valve must be switched over by hand in such a way that the supply is directly connected with the return from the unit. This equipment should be considered as an upstream device for the tong's working device. The connection is often absent because this device involves the running of additional hoses for the valve which can be connected upstream. The large dimension hoses are a hindrance under the restricted space conditions on a working platform and disturb the working procedure.

In the second type of control, a lever valve in the unit is switched to the through direction by pneumatic action on a cylinder. By this means, the hydraulic oil flows to the working device. When the cylinder is reversed, the oil flow is returned directly to the tank. The reversal into the switched-off position is possible by means of a spring return on the lever with simultaneous unloading of the pneumatic cylinder.

Hydraulic screwing devices are normally equipped with pressure limiting equipment, which is designed as a directly controlled installation cartridge for the inlet section of a valve unit. In the normal case, these valves are given a setting value which corresponds to the maximum working pressure. Pressure adjustment is only possible by the use of large tools and is difficult to carry out on site. The adaptation of the tong's screw force to the values prescribed for the pipe material is achieved by adjustment of the pressure limitation of the remotely located hydraulic unit.

Further technical development permitted the appearance of screwing units for which one consumer unit, normally a hydraulic motor, is not sufficient. These screwing units are achieved by the addition of counter-tongs, lift cylinders, process units and similar equipment, which are generally hydraulically operated. The connection of sections into the hand lever valve control makes possible the operation of additional functions using the hydraulics of the screwing device. A maximum permissible pressure must be allocated to each function by means of an additional pressure-limiting valve.

The multiplicity of actuations leads to the appearance of complicated pipe runs whose through areas do not correspond to the arriving oil flow and hence a major part of the hydraulic oil, due to the build-up of pressure in the flow, flows, with heat production, through the main pressure limiting valve into the return. The existing units are not designed for this heat load because, when operating individual functions, the pressure of the major part of the oil flow is always reduced at the main pressure limiting valve, whose setting corresponds to that of the highest consumer unit.

The object of the invention is to provide a remedy and so to design simplified safety and control equipment of the type mentioned at the beginning that the safety requirements, as described above, can be fulfilled using substantially simpler means. The solution in accordance with the invention is characterised by a power part connected to the working medium supply, which power part is equipped with two outlet side connections, of which one connection is connected to a control part for controlling the opening cross-section of the tank-side connection. Particularly advantageous is a power part with a control element in the form of a piston-shaped valve body with equal sized surfaces on both end faces subject to the pressure of the working medium and with a bore running in the direction of the valve body movement, which bore has a conical extension at its inlet flow end. The incident flow side of the valve body is, at the same time, shaped so as to be favorable to flow, for example conically. With this truncated cone shaped generating surface, formed in this manner, the valve body is located in the closed position so as to seal a valve seat and, by this means, blocks the direct connection of the supply with the return to the tank of the operational device.

In contrast to the known devices, the invention has only one single power part with a large through area. It can be controlled by any given large number of connectable control units, which are made small in their installation dimensions and are allocated to different functions. The control requires no outside energy but is also supplied from the working medium supply to the power part. The control part contains the functional information for the power part. The equipment is therefore suitable for simultaneously introducing both the safety functions and the application functions via the power part into the working circuit.

The important function of flap safety can, for example, be examined by a small shut-off valve. A small oil flow, the control oil, flows through the power part. As soon as this oil builds up pressure, the power part closes and permits the flow of the working medium to the consumer unit. In the closed posiion of the safety flap of the working device, the corresponding control valve and subsequently the valve body in the power part are brought into the closed position, so that the free flow to the return is blocked at the power part. A pressure rise can take place in the consumer unit circuit. The relief of the oil flow through the power part is attained as soon as the control valve is opened and the pressure build-up in the control oil can be released through the return connection. With the flap open, it is not possible to activate a consumer unit because the main supply to the device is relieved and hence powerless. Comprehensive protection for the device and also for the personnel is provided by this means.

The regulations of the equipment safety law can be fulfilled in a simple manner by leading, in parallel to the flap safety device, the control oil flow via a thin (approximately 20 mm diameter) hose to a shut-off valve (for example ball cock). A second hose leads from the shut-off valve back to the return connection of the screwing device.

Operation of the tongs or the activation of other consumer units is only possible if the control oil pressure builds up at this control valve. Only by this means is the closing of the power part possible, which closing permits compressed oil to flow to the screwing unit. Permanent opening secures the device against unauthorized use.

Flap safety and the emergency stop switching are individually fully effective by means of a parallel connection. The device can only be operated if both sets of control equipment are closed for operation.

When screwing devices are extended by the connecting of additional consumer units, screwing units arise whose force-producing elements operate at different pressure levels. They are, however, all fed from the supply circuit of the screw tongs. With this extended circuit, it is no longer necessary to deal with the safety of the main circuit from excess pressure at the pressure limiting valve of the unit.

In the subject invention, the pressure limitation of the hydraulic oil circuit occurs by means of the same power part. The control oil is led from the rear side of the valve body in the power part to a pressure limiting pre-control valve in the control part, which pre-control valve is closed in the unloaded condition. If the pressure rises above the set value, an annular gap opens at the control cone of the pre-control valve and a part of the control oil flows to the return connection. The pressure in the supply pipe to the pre-control pressure-limiting valve adjusts itself to the prescribed value, which correspondingly affects the position of the valve body in the power part.

The pressing force of a hydraulic cylinder for a gripping function is continuously adjustable in a similar manner. For this purpose, a further pre-control shut-off valve is again connected to the control oil flow of the same power part, the control pipe of which pre-control shut-off valve being connected to the pressure supply of the hydraulic cylinder. When the required value is attained, the power part limits the main oil flow at this level.

All the control elements which control the power part for its multiple functions are mutually independent and are fundamentally incapable of influencing one another. In the case of simultaneous actuation of several working elements, it is only the lowest pressure value which is permitted in the main circuit. In the case of one of the safety devices switching off, the main working flow is short-circuited to the return and the power supply to a downstream consumer unit is prevented. The protection equipment therefore operates on all the functions belonging to the working device, for example the screwing unit, and produces a comprehensive protection for the device and personnel. Even a defect, such as the destruction or the tearing off of a control pipe, leads to immediate safety switch-off in the power part, which makes a further use of the device impossible until the defect has been corrected.

The control valves can be set up in panel arrangement and, by this means, be varied in number and adapted to the scope of the control. The subject invention is suitable for being externally mounted on various devices as re-equipment. It is fully usable on pneumatically operated devices; for this purpose, it is only necessary to insert the individual parts in the form of pneumatic elements instead of hydraulic valves.

In the drawing, an embodiment example of the invention is shown, purely diagrammatically, and described below. In the drawing.

Figure 1:
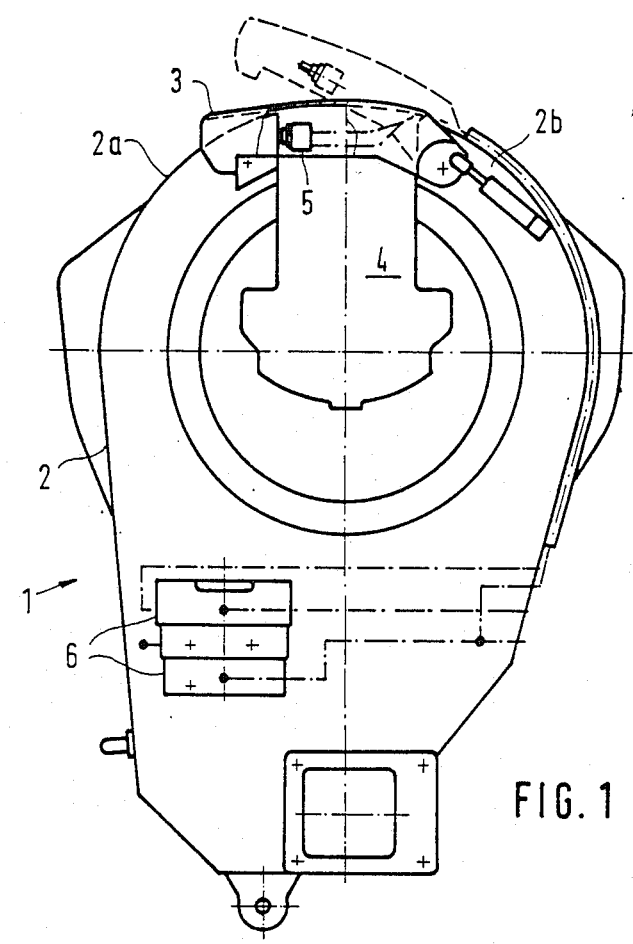
FIG. 1 shows a plan view of screw tongs
Figure 2:
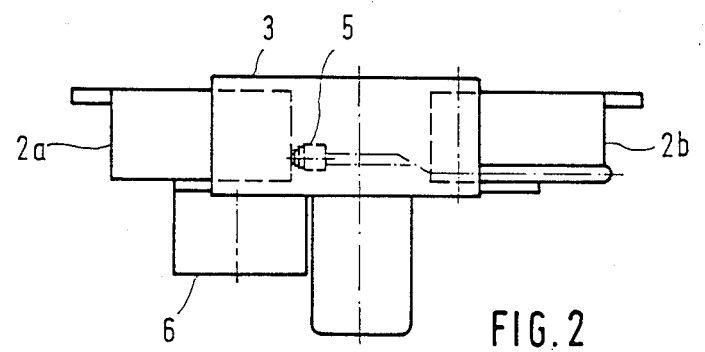
FIG. 2 shows the end view of the screw tongs in accordance with FIG. 1

The screw tongs 1 with the housing 2 are equipped with a safety and locking flap 3 for closing the housing opening 4 and unloading the housing cheeks 2a and 2b. A mechanical contact switch 5 is located on the inner side of the locking flap 3 for examining the flap position.

The switch elements for the tongs' hydraulics are located in a housing extension 6.

Figure 3:
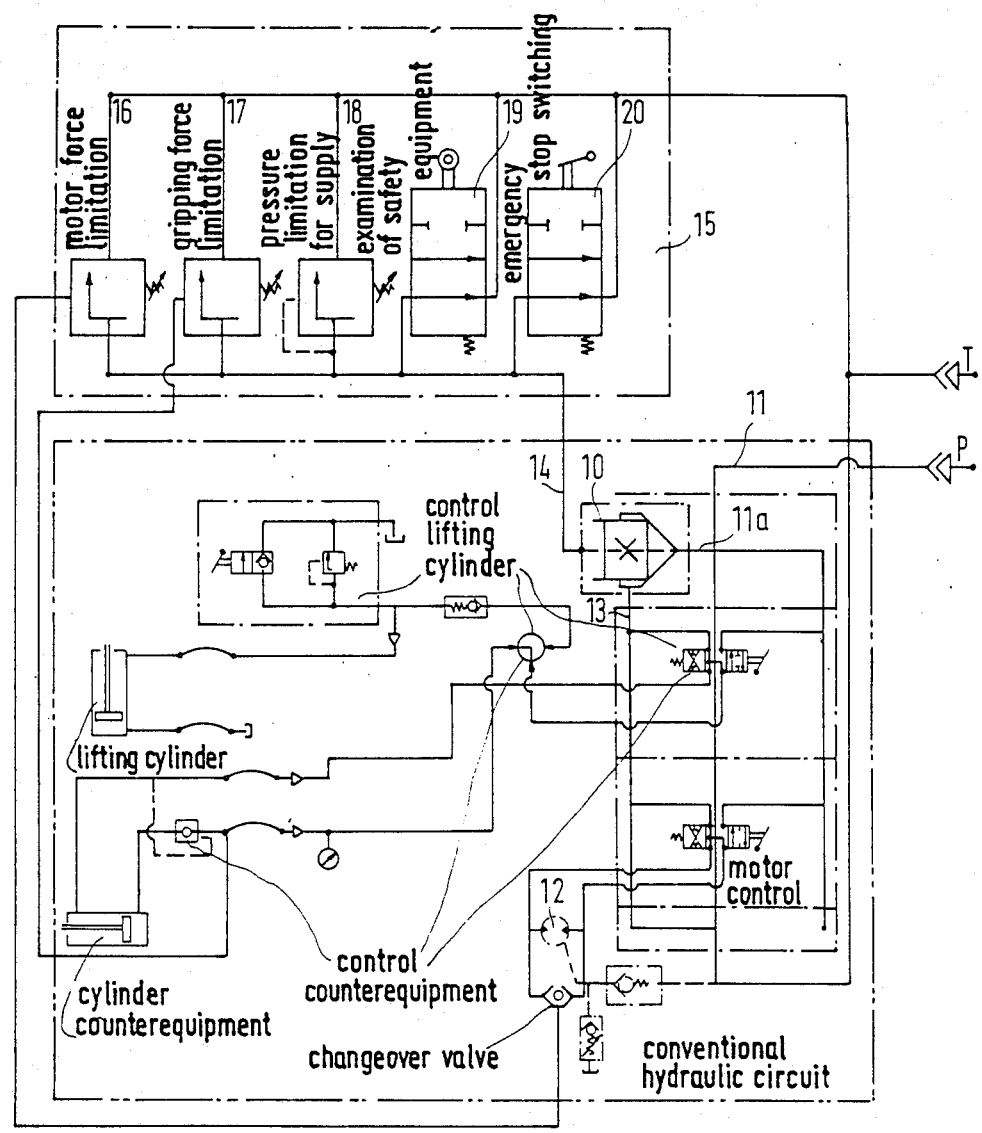
FIG. 3 shows the circuit diagram of a conventional hydraulic circuit for the operational device, in accordance with FIG. 1, with the power part and the control part
Figure 4:
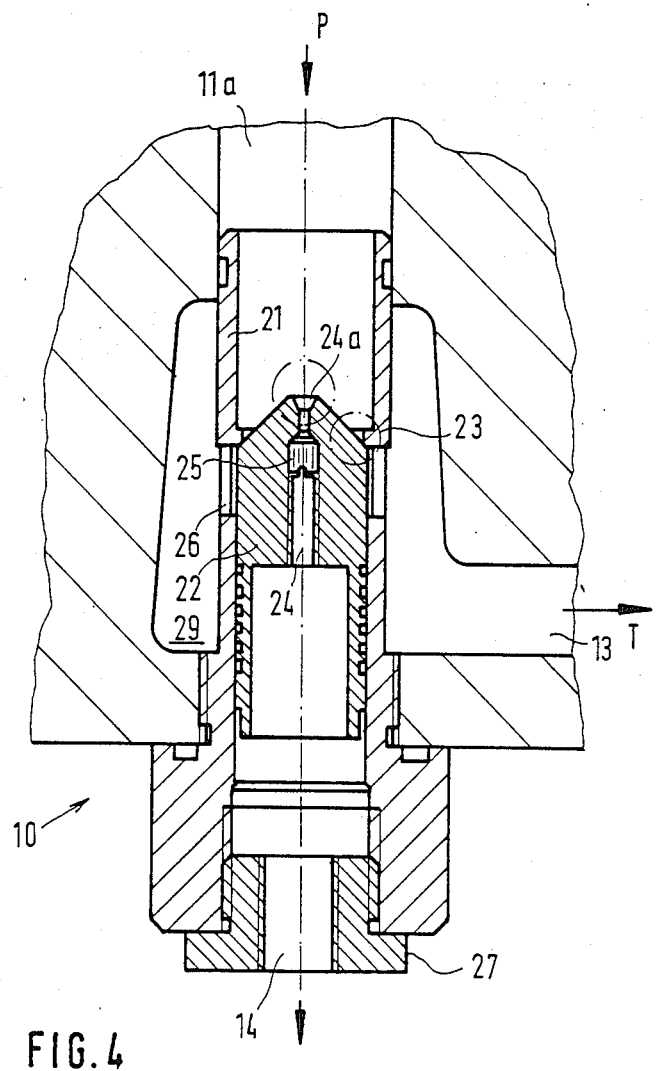
FIG. 4 shows the longitudinal section through the power part.

The power part 10 is connected as a by-pass via the connection 11a with the supply 11 for the drive motor 12 of the operational device (FIG. 3). A connection 13 leads directly from the power part 10 to the tank return. A further connection 14 leads to the control part 15 with several control units for various functions. In the example shown, the control part 15 contains valves 16, 17, 18, 19, and 20 for motor force limitation, for gripping force limitation, for pressure limitation of the working medium, for the examination of a safety device, for example, the safety flap 3, and for switching the emergency stop of the operational device.

The power part 10 of the example shown consists of a valve housing 21 in the form of a screw-in cartridge, in which a piston-shaped valve body 22 is movable and, in the closed position, is in contact with an annular shaped valve seat 23. The valve body is provided with a bore 24 running in its direction of movement. At the inlet flow end, the bore is designed with a funnel-shaped extension 24a. In addition, a flow limiting nozzle 25 is inserted in the bore for calibration purposes. The flow opening for the flowing working medium, when the valve is opened to the tank return 13, is indicated by 26. A limiting end stop 27 at the outlet flow end of the insertion cartridge 21 serves to limit the stroke of the valve body 22.

The working medium flows to the power part 10 through the end face bore of the sleeve-shaped screw-in cartridge 21. In the lower part, the bore narrows in the manner of a seat and forms a peripheral edge 23, which serves as a sealing surface for the valve body 22. As soon as the end face of the valve body comes in contact with this sealing edge, the flow of the working medium through the insertion cartridge, i.e. through the relieved sealing bore 26, to the return connection 13 is blocked.

The supply of the working medium is accurately limited by the screw-in nozzle 25, it is matched to the magnitude of the control elements 16 to 20 and influences the switching speed. Control valves 16 to 20 are jointly connected by the connection 14 to power part 10. As soon as all the pre-control valves are closed, a pressure builds up behind the valve body 22 via the control nozzle, which pressure exceeds that of the supply to a small extent. This force moves the valve body to the sealing edge 23 against the incident flow direction and subsequently blocks the throughflow. At this moment, the rear side of the valve body attains excess surface area, since the supply surface area is reduced by the contact of the valve body with the sealing edge. The excess surface area effects a stable switching position of the valve body in the closed position of the power part.

The closing force for the closing movement of the valve body 22 is obtained by the shaping of the nozzle supply 24a. The funnel-shaped or nozzle-shaped inlet is located as a direct inlet flow surface in the center of the supply flow, which, due to the conical design of the inlet flow side of the valve body, experiences, with the valve body open, a gentle deflection into the return annular space 29 outside the power part.

The inflowing working medium is concentrated in the funnel-shaped intake 24a of the bore 24 onto the throughflow limiting nozzle 25. A build-up of dynamic pressure occurs, which is continued through the bore 24 into the space on the rear side of the valve body and there increases the pressure above the pressure on the inlet flow side. By means of this, the valve body experiences a closing movement in the open condition although, up to the moment of sealing, the surface area of the valve body inlet flow side is just as large as the surface area on the outlet flow and no spring is used for return positioning. The movement force for the valve body thus adapts itself automatically to the throughflow conditions. The employment of an additional closing spring is, however, equally possible.

We claim:

1. A screw tong for screwing drilling industry sucker rods, casing and drill pipes together and apart comprising,
    screw tongs having a hydraulic drive means connected between a hydraulic supply and a fluid return tank, and having at least one control unit,
    a hydraulic safety interlock system connected between the hydraulic supply and the return tank for bypassing the hydraulic drive means when actuated by at least one control unit including,
        a body having first, second and third ports, said first port being connected to the hydraulic supply and axially aligned with the longitudinal axis of the body, said second port being an annular side port connected to the return tank, and the third port being connected to said control unit,
        a springless piston-shaped fluid actuated valve movable along the longitudinal axis of the body between the first and third ports, said piston-shaped valve having first and second ends of equally large surface areas,
    said body including an annular valve seat positioned between the first and second ports and extending inwardly in the body,
    said piston having a longitudinal bore therethrough, and said first end being a conical extending surface which seats on the valve seat in a closed position whereby the first end then has a smaller area than the area of the second end exposed to fluid pressure,
    said bore having a funnel-shaped extension directed outwardly at its inlet flow end and directed axially toward the first port for concentrating in flowing hydraulic supply fluid from the first port into the bore and into the body at the second end of the piston causing a buildup of pressure acting on the piston to move the piston to its closed position.

2. The apparatus of claim 1 including a plurality of control units connected between different functions and connected in parallel to the third port.

3. The apparatus of claim 1 wherein the control unit includes an emergency stop valve for the screw tongs.

4. The apparatus of claim 1 wherein the control unit includes an examination valve.

5. The apparatus of claim 1 wherein the control unit contains a pressure limiting valve for the hydraulic fluid.

6. The apparatus of claim 1 wherein the control unit contains a valve for gripping force limitation of the screw tongs.

7. The apparatus of claim 1 wherein the control unit includes a limiting valve for the hydraulic drive means.

* * * * *